No. 657,747. Patented Sept. 11, 1900.
J. RYAN.
POTATO PLANTING MACHINE.
(Application filed July 11, 1900.)
(No Model.)
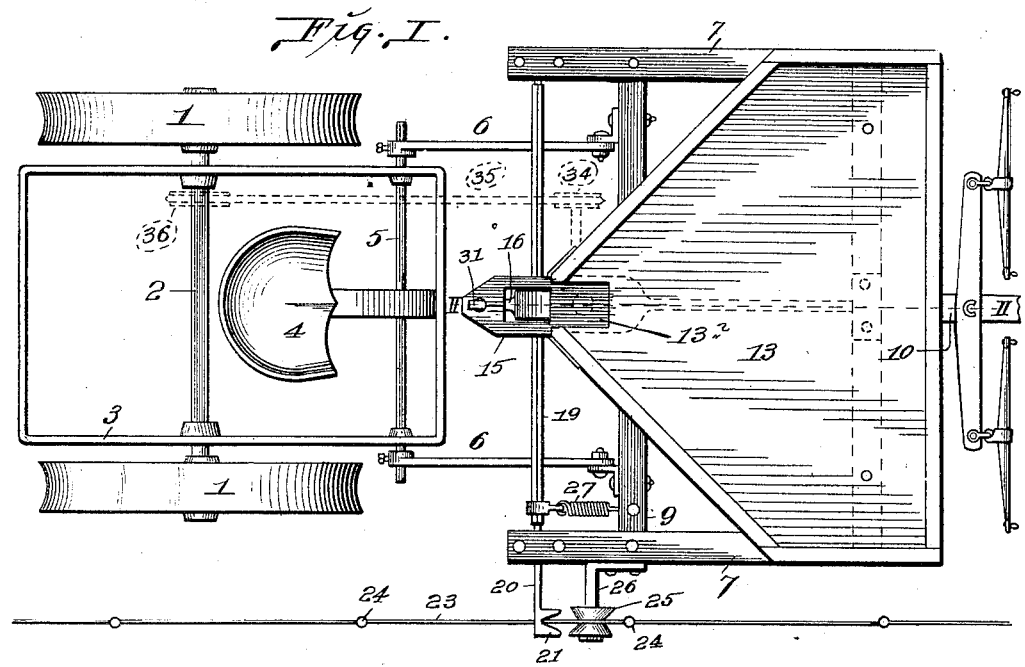
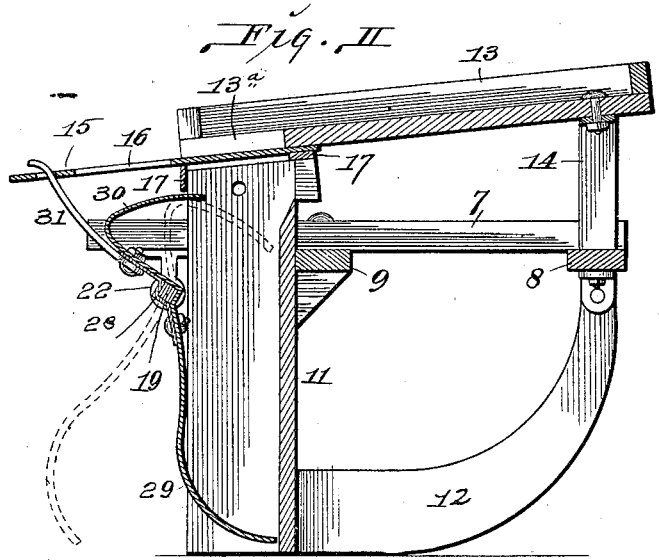
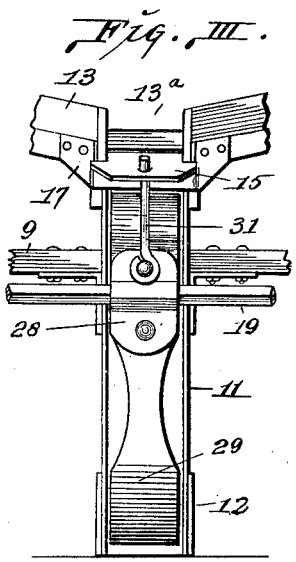
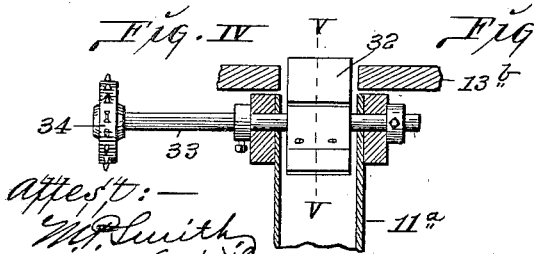
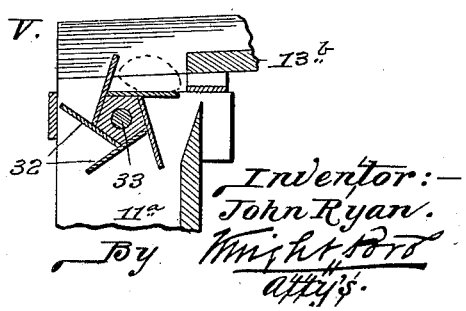
Inventor:—
John Ryan.

UNITED STATES PATENT OFFICE.

JOHN RYAN, OF WANDA, ILLINOIS.

POTATO-PLANTING MACHINE.

SPECIFICATION forming part of Letters Patent No. 657,747, dated September 11, 1900.

Application filed July 11, 1900. Serial No. 23,240½. (No model.)

*To all whom it may concern:*

Be it known that I, JOHN RYAN, a citizen of the United States, residing at Wanda, in the county of Madison and State of Illinois, have invented certain new and useful Improvements in Potato-Planting Machines, of which the following is a full, clear, and exact description, reference being had to the accompanying drawings, forming part of this specification.

My invention relates to a machine for service in planting potatoes in rows by the use of a check-wire, the machine being so constructed that it cuts its own furrow and automatically drops the potato sets in the proper locations.

The invention consists in features of novelty hereinafter fully described, and pointed out in the claims.

Figure I is a top or plan view of my machine. Fig. II is a vertical sectional view taken on line II II, Fig. I. Fig. III is a view in rear elevation of the dropping mechanism. Fig. IV is a view, partly in rear elevation and partly in vertical section, of a modified form of dropping mechanism used in drilling potato sets into the ground. Fig. V is a vertical sectional view taken on line V V, Fig. IV.

In constructing my machine I utilize ground-wheels and runner-gear frame of similar description to those of corn-planting machines, and where desired my improvement may be applied to the running-gear of an ordinary corn-planter on the removal of the planting apparatus.

1 designates the ground-wheels, connected by an axle 2, and 3 is a running-gear frame carried by said axle.

4 is a seat carried by the frame 3.

5 designates a cross-rod mounted in the frame 3 and having connected thereto the forwardly-extending links 6.

7 designates the side bars of a frame, connected by a front cross-bar 8 and a rear cross-bar 9. The rear cross-bar 9 receives the pivotal connection of the links 6, and the front cross-bar 8 receives the attachment of the draft-tongue 10.

11 designates a chute secured to the rear cross-bar 9 and extending downwardly therefrom.

12 designates a runner or furrow-opener attached to the lower end of the chute 11 and extending forwardly to the front cross-bar 8, to which it is suitably fixed.

13 designates a table adapted to hold the potato sets to be planted, the table being mounted upon the upper end of the chute 11 and a forward support 14, carried by the front cross-bar 8 of the planter-frame. The forward end of the table 13 is arranged at a greater elevation than the rear end, (see Fig. II,) so that the table is inclined rearwardly in order that the potato sets may gradually work downwardly upon the table as the planter is conveyed over the ground. The rear end of the table tapers inwardly in order that the potato sets will be conveyed to a central location in front of the seat 4, upon which the driver of the machine rides and where he is in convenient position to reach the rear end of the table.

15 designates a slide provided with an aperture 16, the said slide being mounted in guides 17 beneath a slot 13$^a$ in the rear end of the table 13. The slide 15 is adapted to receive the potato sets, and they are deposited from such slide into the chute 11 through the aperture 16 on the forward throw of the slide in the operation of the parts hereinafter described.

19 designates a rocking rod journaled in hangers 22, carried by the frame side bars 7, the said rocking rod being provided with an extension 20, containing a notch 21, that receives the check-wire 23 and is adapted to be tripped by the buttons 24 each time that the buttons are encountered by the notched extension in the travel of the machine. The check-wire is upheld by a sheave 25, carried by a bracket 26. The rocking rod 19 is connected to the rear-frame cross-bar 9 by a retracting-spring 27, that returns the rocking rod each time that the rod is tripped by a button of the check-wire.

28 designates a rocker carried by the rocking rod 19. This rocker is provided with a lower curved arm 29 and an upper curved arm 30, both of which are so positioned upon the rocking rod as to be capable of entering the chute 11. The upper arm 30 carries a finger 31, that passes loosely through the slide 15.

In the operation of the machine the buttons upon the check-wire 23 come in contact with the notched extension 20 of the rocking rod 19 and trip said rocking rod. As the rocking rod is moved the rocker 28 is carried therewith and the upper arm 30 of the rocker is thrown into the chute 11, while the lower arm 29 is thrown outwardly, as seen by dotted lines in Fig. II. As the rocker is moved in the manner stated, the finger 31 is moved with the arm 30 and carries therewith the slide 15, said slide being moved inwardly until the aperture 16 occupies a position immediately above the open upper end of the chute 11. Each time that the slide 15 assumes its retracted position, as seen in Fig. II, the man who feeds the potatoes places a potato set on the slide and as the slide is moved inwardly in the manner explained the potato set falls through the aperture 16 into the chute 11 and onto the inwardly-thrown arm 30 of the rocker 28. As the check-wire button slips past the notched extension of the rocking rod, the spring 27 returns said rod to its normal position, and the slide 15 is retracted ready for the deposit of another potato-set thereon. As the rocking rod returns under the action of the spring, the upper arm 30 is thrown outwardly and the lower arm 29 is moved inwardly, so that the potato set received by the upper arm is thrown therefrom and, falling on the chute 11, drops upon the lower arm 29, where it is held until the rocker is again moved by the next check-wire button, at which time it is deposited into the ground from the rocker-arm, while the next set is being delivered through the slide 15 onto the upper rocker-arm 30. It will therefore be seen that the potato sets are accurately deposited in the ground at the same intervals as the distance between the check-wire buttons, and that they are therefore planted uniformly.

In some instances it is desirable to drill potatoes into the ground, and to provide for such drilling I have shown a revolving dropping-wheel. (Illustrated in Figs. IV and V.) When the dropping-wheel is used, the rocker 28 is dispensed with and the dropping-wheel 32 is placed in the upper end of the chute 11ª, being mounted on a shaft 33, provided with a sprocket-wheel 34. The sprocket-wheel 34 receives an endless chain 35, (indicated by dotted lines in Fig. I,) that leads to and around a sprocket-wheel 36 on the axle 2 of the planter. As the planter is conveyed over the ground the shaft 33 is revolved by its connection with the planter-axle and the dropping-wheel 32 is rotated, during which time the potato sets are placed on the wheel as rapidly as needed and fall from the wheel in uniform manner through the chute to the ground.

I claim as my invention—

1. In a potato-planter, the combination of a table, a runner, a chute arranged beneath said table, an apertured slide arranged above said chute, a rocker arranged beneath said slide, and having arms adapted to enter said chute, and means for operating said rocker and slide, substantially as described.

2. In a potato-planter, the combination of a table, a chute arranged beneath said table, a runner, an apertured slide arranged above said chute, a rocking rod adapted to receive the engagement of a check-wire, a rocker having arms adapted to enter said chute, and a finger carried by said rocker and arranged in engagement with said slide, substantially as described.

3. In a potato-planter, the combination of a table, a chute arranged beneath said table, a runner, an apertured slide arranged above said chute, a rocking rod adapted to receive the engagement of a check-wire, a spring for retracting said rod, a rocker provided with upper and lower curved arms adapted to alternately enter said chute, and a finger carried by said rocker and having engagement with said slide, substantially as described.

JOHN RYAN.

In presence of—
J. H. SANNER,
L. H. BUCKLEY.